United States Patent
Wada

(10) Patent No.: US 10,513,289 B2
(45) Date of Patent: Dec. 24, 2019

(54) ENCODER, ROBOT, AND PRINTER

(71) Applicant: Seiko Epson Corporation, Tokyo (JP)

(72) Inventor: Hiroshi Wada, Azumino (JP)

(73) Assignee: Seiko Epson Corporation (JP)

( * ) Notice: Subject to any disclaimer, the term of this patent is extended or adjusted under 35 U.S.C. 154(b) by 109 days.

(21) Appl. No.: 15/845,041

(22) Filed: Dec. 18, 2017

(65) Prior Publication Data

US 2018/0170423 A1    Jun. 21, 2018

(30) Foreign Application Priority Data

Dec. 19, 2016   (JP) .................................. 2016-245139

(51) Int. Cl.
| | |
|---|---|
| *B62D 5/04* | (2006.01) |
| *G01D 5/34* | (2006.01) |
| *G01D 5/347* | (2006.01) |
| *G01L 3/08* | (2006.01) |
| *G01L 3/12* | (2006.01) |
| *B41J 19/20* | (2006.01) |

(52) U.S. Cl.
CPC ........... *B62D 5/0481* (2013.01); *G01D 5/345* (2013.01); *B41J 19/207* (2013.01); *G01D 5/3473* (2013.01); *G01D 5/34715* (2013.01); *G01L 3/08* (2013.01); *G01L 3/12* (2013.01)

(58) Field of Classification Search
CPC .. B62D 5/0481; G01D 5/345; G01D 5/34715; G01D 5/3473; B41J 19/207; G01L 3/12; G01L 3/08
See application file for complete search history.

(56) References Cited

U.S. PATENT DOCUMENTS

| | | | | |
|---|---|---|---|---|
| 3,584,959 | A * | 6/1971 | Del Carlo | ............. G01D 5/345 250/231.13 |
| 5,424,535 | A * | 6/1995 | Albion | .................. G01D 5/345 250/225 |
| 5,602,388 | A * | 2/1997 | Maenza | ............ G01D 5/34715 250/201.5 |
| 2014/0360804 | A1 | 12/2014 | Oguchi et al. | |

FOREIGN PATENT DOCUMENTS

WO    WO-2013-065737 A1    5/2013

* cited by examiner

*Primary Examiner* — David V Bruce
(74) *Attorney, Agent, or Firm* — Harness, Dickey & Pierce, P.L.C.

(57) ABSTRACT

An encoder includes an optical scale that has a phase difference plate, a light source section that irradiates the phase difference plate with light, and a light receiving section that receives the light from the phase difference plate, and outputs a signal corresponding to a received light intensity. The light emitted from the light source section is linearly polarized, and the light receiving section outputs a signal corresponding to a polarization state of the light from the phase difference plate.

16 Claims, 14 Drawing Sheets

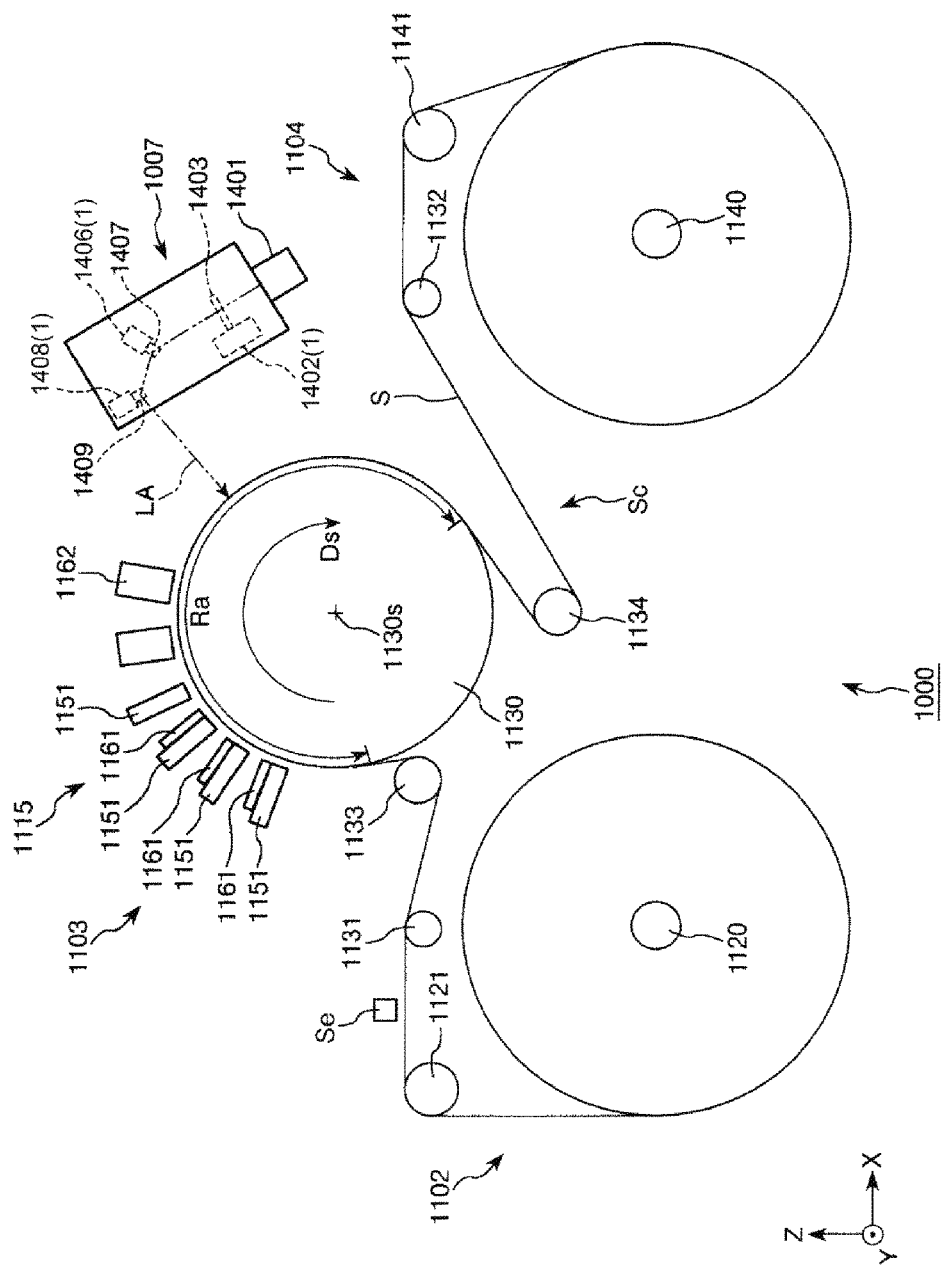

ENCODER, ROBOT, AND PRINTER

BACKGROUND

1. Technical Field

The present invention relates to an encoder, a robot, and a printer.

2. Related Art

An optical rotary encoder is generally known as one kind of encoder (for example, refer to International Publication No. 2013/065737). For example, a rotary encoder is used for a robot provided with a robot arm having a rotatable joint, and detects rotation states such as a rotation angle, a rotation position, a number of rotations, and a rotation speed of the joint.

For example, an encoder unit related to International Publication No. 2013/065737 includes an optical scale and an optical sensor package. The optical scale has a polarizer which rotates about the center. The optical sensor package has two optical sensors facing the polarizer at positions 180° symmetric to each other with respect to the center of the polarizer.

However, in the encoder related to International Publication No. 2013/065737, manufacturing cost of the polarizer provided in the optical scale is high, and, as a result, there is a problem in that it is hard to achieve low cost of the encoder.

SUMMARY

An advantage of some aspects of the invention is to provide an encoder capable of achieving low cost, and to provide a robot and a printer having such an encoder.

The advantage can be achieved by the following configurations.

An encoder according to an aspect of the invention includes an optical scale that has a phase difference plate; a light source section that irradiates the phase difference plate with light; and a light receiving section that receives the light from the phase difference plate, and outputs a signal corresponding to a received light intensity.

According to the encoder, since a polarization state of light from the phase difference plate changes according to a rotation state of the optical scale, it is possible to detect a rotation state of the optical scale by using a light reception result in the light receiving section. Therefore, it is possible to detect a rotation state of the optical scale without using a polarization plate in the optical scale. Manufacturing cost of the phase difference plate is relatively low, and thus it is possible to achieve low cost of the encoder. The phase difference plate is an optical element causing a phase difference (optical path difference) in two polarization components which are orthogonal to each other, and, particularly, an optical element causing a phase difference corresponding to a ¼ wavelength is referred to as a λ/4 plate, and optical element causing a phase difference corresponding to a ½ wavelength is referred to as a λ/2 plate.

In the encoder according to the aspect of the invention, it is preferable that the phase difference plate is a λ/4 plate, and the optical scale includes a reflection plate that is disposed on an opposite side to the light source section with respect to the phase difference plate and has light reflection property.

With this configuration, it is possible to implement a reflection type encoder.

In the encoder according to the aspect of the invention, it is preferable that the phase difference plate is a λ/2 plate, and at least a part of the phase difference plate is disposed between the light source section and the light receiving section.

With this configuration, it is possible to implement a transmission type encoder.

In the encoder according to the aspect of the invention, it is preferable that the light emitted from the light source section is linearly polarized, and the light receiving section outputs a signal corresponding to a polarization state of the light from the phase difference plate.

With this configuration, a polarization state of light from the phase difference plate can be changed according to a rotation state of the optical scale. An output signal from the light receiving section can be changed according to a rotation state of the optical scale.

In the encoder according to the aspect of the invention, it is preferable that the light source section includes a surface emitting laser.

With this configuration, it is possible to realize miniaturization of the light source section, and to implement the light source section emitting linearly polarized light. Since the directivity of light from the surface emitting laser is considerably high, crosstalk in the light receiving section can be reduced, and, as a result, the detection accuracy can be improved. A wavelength region of light from the surface emitting laser is considerably narrow, and thus it is possible to reduce deterioration in the detection accuracy due to wavelength dependency of an optical component such as the phase difference plate.

In the encoder according to the aspect of the invention, it is preferable that the light source section includes a light emitting diode; and a polarization plate at least a part of which is disposed between the light emitting diode and the phase difference plate.

With this configuration, it is possible to implement the light source section which has a long service life and stably emits linearly polarized light with a reliably simple and cheap configuration.

In the encoder according to the aspect of the invention, it is preferable that the light receiving section includes a light receiving element; and a polarization plate at least apart of which is disposed between the light receiving element and the phase difference plate.

With this configuration, it is possible to implement the light receiving section which outputs a signal corresponding to a polarization state of light from the phase difference plate with a relatively simple configuration.

In the encoder according to the aspect of the invention, it is preferable that the optical scale includes identification patterns which are provided in a circumferential direction around a central axis of the optical scale and are different from each other every 90° in the circumferential direction.

With this configuration, it is possible to implement an absolute type encoder.

A robot according to an aspect of the invention includes the encoder according to the aspect of the invention.

According to the robot, it is possible to achieve low cost of the encoder, and thus to achieve low cost of the robot.

A printer according to an aspect of the invention includes the encoder according to the aspect of the invention.

According to the printer, it is possible to achieve low cost of the encoder, and thus to achieve low cost of the printer.

BRIEF DESCRIPTION OF THE DRAWINGS

The invention will be described with reference to the accompanying drawings, wherein like numbers reference like elements.

FIG. 14 is a side view illustrating a printer of an embodiment of the invention.

DESCRIPTION OF EXEMPLARY EMBODIMENTS

Hereinafter, an encoder, a robot, and a printer according to embodiments of the invention will be described in detail with reference to the accompanying drawings.

1. Encoder

First Embodiment

Figure 1:
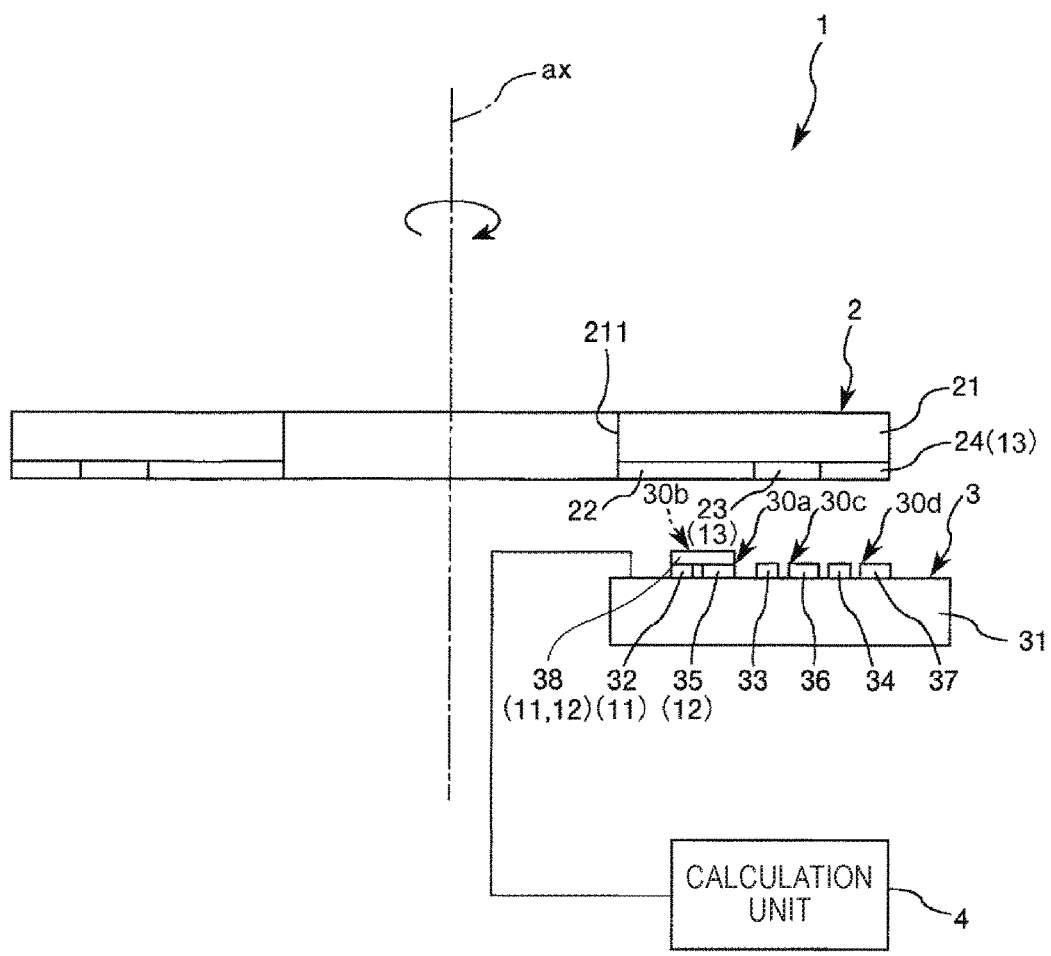
FIG. 1 is a schematic diagram for explaining an encoder according to a first embodiment of the invention.
Figure 2:
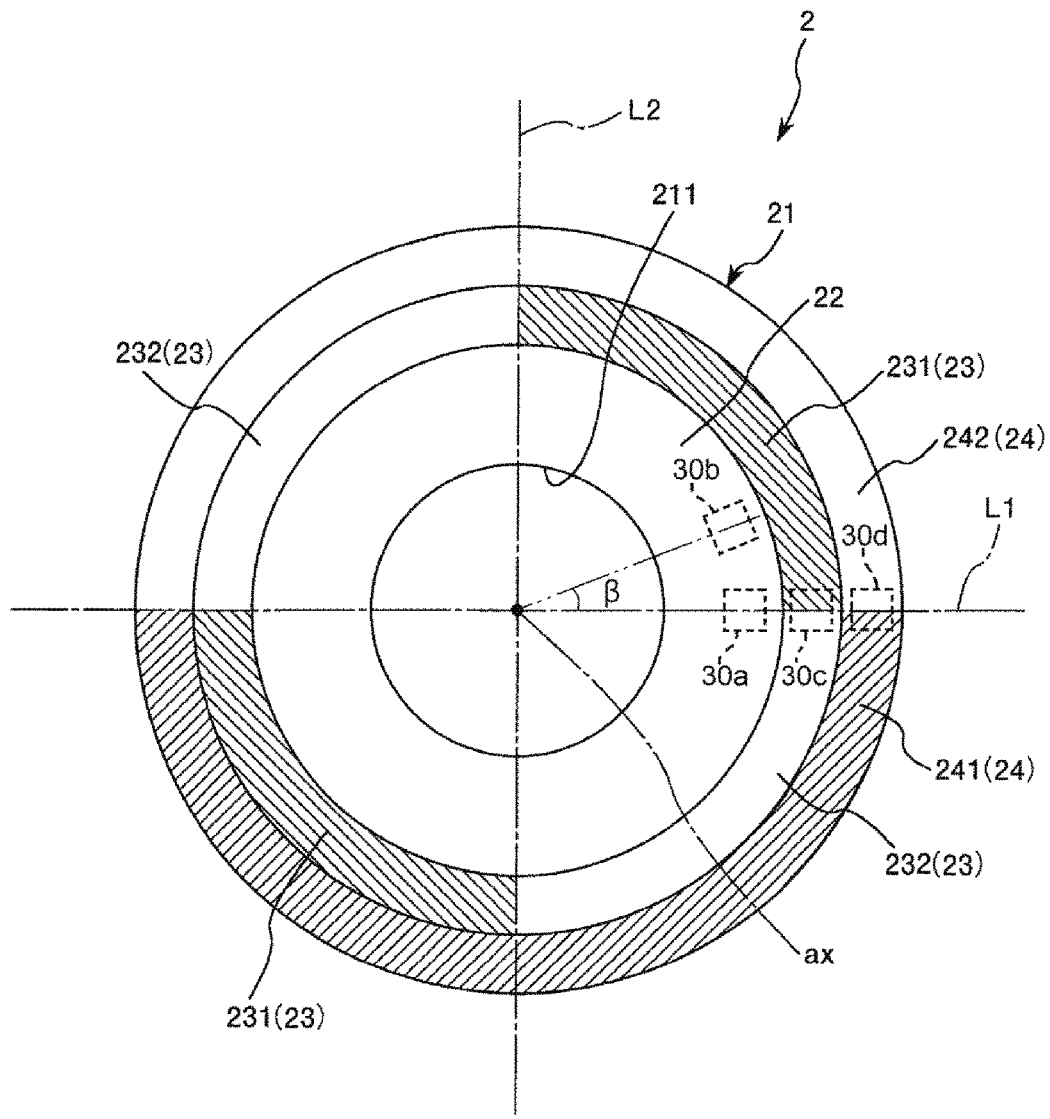
FIG. 2 is a plan view for explaining an optical scale provided in the encoder illustrated in FIG. 1.
Figure 3:
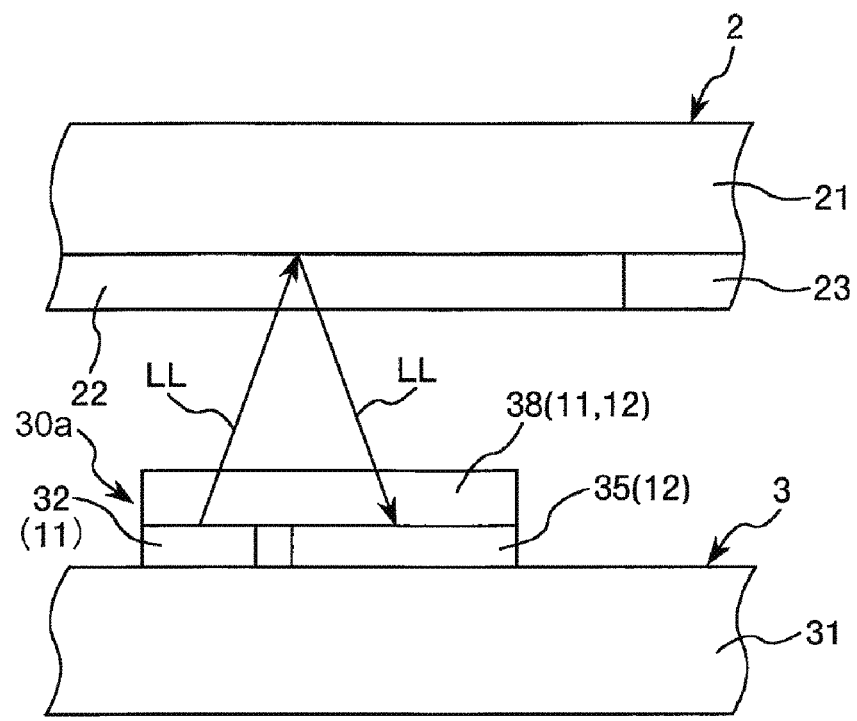
FIG. 3 is a schematic sectional view for explaining a light source section (first light source section) and a light receiving section (first light receiving section) provided in the encoder illustrated in FIG. 1.

FIG. 1 is a schematic diagram for explaining an encoder according to a first embodiment of the invention. FIG. 2 is a plan view for explaining an optical scale provided in the encoder illustrated in FIG. 1. FIG. 3 is a schematic sectional view for explaining a light source section (first light source section) and a light receiving section (first light receiving section) provided in the encoder illustrated in FIG. 1.

An encoder 1 illustrated in FIG. 1 is a reflection type optical rotary encoder. In the present embodiment, the encoder 1 is an absolute encoder. As illustrated in FIG. 1, the encoder 1 includes an optical scale 2 which rotates about a rotation axis ax, a sensor unit 3 which faces the optical scale 2 and is fixedly provided, and a calculation unit 4 which is electrically connected to the sensor unit 3.

The optical scale 2 has a reflection plate 21, and a phase difference plate 22, a first track 23, and a second track 24 provided on one surface (a lower surface in FIG. 1) of the reflection plate 21. Here, the first track 23 and the second track 24 form 90° determination patterns 13 having different identification patterns every 90° in a circumferential direction of the optical scale 2. In a case where the encoder 1 is used as an incremental encoder, the first track 23 and the second track 24 may be omitted.

The sensor unit 3 includes a substrate 31, and four sensor portions 30a, 30b, 30c and 30d provided on a surface of the substrate 31 on the optical scale 2 side. Here, each of the sensor portions 30a and 30b has a light emitting element 32, a light receiving element 35, and a polarization plate 38. The light emitting element 32 and the polarization plate 38 form a "light source section 11 (first light source section)" emitting light applied to the phase difference plate 22 of the optical scale 2, and the light receiving element 35 and the polarization plate 38 form a "light receiving section 12 (first light receiving section)" receiving light from the phase difference plate 22. The sensor portion 30c has a light emitting element 33 and a light receiving element 36. The light emitting element 33 forms a "second light source section" emitting light applied to the first track 23, and the light receiving element 36 forms a "second light receiving section" receiving light from the first track 23. The sensor portion 30d has a light emitting element 34 and a light receiving element 37. The light emitting element 34 forms a "third light source section" emitting light applied to the second track 24, and the light receiving element 37 forms a "third light receiving section" receiving light from the second track 24.

The calculation unit 4 determines rotation states (a rotation angle, a rotation speed, a rotation direction, and the like) of the optical scale 2 on the basis of signals (an A-phase signal and a B-phase signal) from the light receiving elements 35 of the sensor portions 30a and 30b, a signal (first track signal) from the light receiving element 36 of the sensor portion 30c, and a signal (second track signal) from the light receiving element 37 of the sensor portion 30d.

Hereinafter, each unit of the encoder 1 will be described in detail.

Optical Scale

As described above, the optical scale 2 illustrated in FIG. 2 has the reflection plate 21, and the phase difference plate 22, the first track 23, and the second track 24 provided on one surface (the lower surface in FIG. 1) of the reflection plate 21.

As illustrated in FIG. 2, the reflection plate 21 (substrate) has a circular plate shape, and is provided with a hole 211 penetrating in a thickness direction thereof. For example, the hole 211 may be used to be attached to a member (not illustrated) rotating about the rotation axis ax. An outer shape of the reflection plate 21 in a plan view is not limited to a circular shape, and may be any shape.

The reflection plate 21 has reflection property for light from the light emitting elements 32, 33 and 34. A constituent material of the reflection plate 21 is not particularly limited, and, for example, a metal material, a semiconductor material, a glass material, and a resin material may be used. The reflection plate 21 may be made of a combination of two different kinds of materials. For example, at least two of a constituent material of a portion in which the phase difference plate 22 is provided, a constituent material of a portion in which the first track 23 is provided, and a constituent material of a portion in which the second track 24 is provided may be different from each other. The surface of the reflection plate 21 on which the phase difference plate 22, the first track 23, and the second track 24 are provided may have the reflection property for light, and remaining surfaces may not have the reflection property for light.

The phase difference plate 22, the first track 23, and the second track 24 are arranged in this order from the central side toward the outer circumferential side of the reflection plate 21 on one surface of the reflection plate 21.

The phase difference plate 22 has a plate shape or a film shape, and is joined to one surface of the reflection plate 21 via an optical adhesive or the like. The phase difference plate 22 is an optical element causing a phase difference (optical path difference) corresponding to ¼ wavelength in two polarization components which are orthogonal to each other, that is, a λ/4 plate. A constituent material of the phase difference plate 22 is not particularly limited, and, for example, birefringence materials such as a quartz crystal, an $MgF_2$ crystal, and a birefringence polymer may be used. The phase difference plate 22 may be manufactured in the same manner as a well-known phase difference plate. A phase difference caused by the phase difference plate 22 may be $(2n+1)\times\lambda/4$. Here, n is an integer of 0 or greater. The phase difference plate 22 may be formed of a combination of a plurality of phase difference plates such that the phase difference is caused.

The first track 23 is provided along a circumference centering on the rotation axis ax, and is formed of two regions 231 (an upper right side and a lower left side in FIG. 2) facing each other and two remaining regions 232 (a lower right side and an upper left side in FIG. 2) facing each other among the four separate regions obtained as a result of division using line segments L1 and L2 which pass through the rotation axis ax and are orthogonal to each other, when viewed from a direction along the rotation axis ax (hereinafter, also referred to as "in a plan view").

The region 231 and the region 232 have differing light reflectance. Specifically, the region 231 is configured to absorb light from the light emitting element 33, and the region 232 is configured to reflect light from the light emitting element 33. Therefore, the reflectance of the region 232 for light from the light emitting element 33 is higher than the reflectance of the region 231 for light from the light emitting element 33.

For example, a thin film having anti-reflection property for light from the light emitting element 33 is provided in each region 231, but, on the other hand, the thin film is not provided in each region 232. The thin film may have anti-reflection property or absorption property for light from the light emitting element 33, and is not particularly limited, but may be, for example, a black coating film or a dielectric multilayer film. The thin film may be formed by using a well-known film formation method. The light reflectance of the region 231 and the light reflectance of the region 232 may be different from each other, and, for example, treatment (or processing) may be performed on the reflection plate 21 such that light is transmitted in one of the region 231 and the region 232, and the treatment (or the processing) may not be performed such that light is reflected in the other region.

The second track 24 is provided along the circumference centering on the rotation axis ax, and is formed of one region 241 (a lower side in FIG. 2) of two separate regions obtained as a result of division using line segment L1 passing through the rotation axis ax, and the other region 242 (an upper side in FIG. 2). Here, combinations of the regions 241 and 242 and the regions 231 and 232 of the first track 23 are 90° determination patterns 13 as "identification patterns" which are different every 90° in the circumferential direction of the optical scale 2.

The region 241 and the region 242 have differing light reflectance in the same manner as the above-described regions 231 and 232 of the first track 23. Specifically, the region 241 is configured to absorb light from the light emitting element 34, and the region 242 is configured to reflect light from the light emitting element 34. Therefore, the reflectance of the region 242 for light from the light emitting element 34 is higher than the reflectance of the region 241 for light from the light emitting element 34.

The regions 241 and 242 may be formed according to the presence or absence of a thin film in the same manner as the regions 231 and 232 of the first track 23. The second track 24 may be formed along with the first track 23.

Sensor Unit

The sensor unit 3 illustrated in FIG. 1 includes, as described above, the substrate 31, and the sensor portions 30a, 30b, 30c and 30d provided on the surface of the substrate 31 on the optical scale 2 side.

The substrate 31 is attached to a member (not illustrated) which does not rotate about the rotation axis ax. The substrate 31 is, for example, a wiring substrate, supports the sensor portions 30a, 30b, 30c and 30d, and is also electrically connected thereto. The substrate 31 is electrically connected to the calculation unit 4 illustrated in FIG. 1 via a wiring (not illustrated).

As illustrated in FIG. 2, the sensor portions 30a and 30b are disposed at positions deviated by an angle β (for example, β=22.5°) around the rotation axis ax on the same circumference centering on the rotation axis ax in a plan view. The sensor portions 30a, 30c and 30d are disposed side by side in this order along the radial direction from the central side toward the outer circumferential side of the optical scale 2 in a plan view. Arrangement of the sensor portions 30a, 30b, 30c and 30d is not limited to the illustrated arrangement as long as a rotation state of the optical scale 2 can be detected.

Each of the sensor portions 30a and 30b illustrated in FIG. 1 includes the light emitting element 32, the light receiving element 35, and the polarization plate 38. As illustrated in FIG. 3, the light emitting element 32 applies light LL to the phase difference plate 22 of the optical scale 2 via the polarization plate 38, and the light receiving element 35 receives the light LL reflected at the optical scale 2 via the polarization plate 38. Here, the light emitting element 32 and the polarization plate 38 forming the light source section 11 are configured to emit linearly polarized light toward the phase difference plate 22. The light receiving element 35 and the polarization plate 38 forming the light receiving section 12 are configured to output a signal corresponding to a polarization state of light from the phase difference plate 22.

The light emitting element 32 is, for example, a light emitting diode, and emits natural light or partially polarized light. The "natural light" is light in which an oscillation direction of an electric field is uniformly distributed in any direction, and which oscillates irregularly with respect to the time. The "partially polarized light" is light in which distributions of oscillation directions of electric fields do not match each other, and the intensity of an electric field oscillating in a specific direction is higher than that in other directions. Light emitted from the light emitting element 32 may be light including an oscillation direction component along a polarization axis direction (transmission axis direction) of the polarization plate 38 which will be described later, and the oscillation direction component is preferably constant. The light emitting element 32 is not limited to a light emitting diode, and may be a semiconductor laser.

The light receiving element 35 is a photodiode using, for example, GaAs or Si, and has a function of outputting a current corresponding to a received light intensity as a detection signal.

The polarization plate 38 is disposed to overlap both of the light emitting element 32 and the light receiving element 35 in a plan view. The polarization plate 38 is joined to both of the light emitting element 32 and the light receiving element 35 via, for example, an optical adhesive, so as to be integrated with the light emitting element 32 and the light receiving element 35. The polarization plate 38 forms a part of the light source section 11 and also forms a part of the light receiving section 12, but a polarization plate forming a part of the light source section 11 and a polarization plate forming a part of the light receiving section 12 may be separately provided.

The polarization plate 38 has polarization characteristics of selectively transmitting P polarized light therethrough and reflecting S polarized light. In the present embodiment, a direction of a polarization axis of the polarization plate 38 of the sensor portion 30a is parallel to a direction of a polarization axis of the polarization plate 38 of the sensor portion 30b. The polarization plate 38 is not particularly limited, but may employ, for example, a polarization plate in which a wire grid is formed by using a metal material such as aluminum (Al), copper (Cu), chromium (Cr), gold (Au), iron (Fe), platinum (Pt), or an alloy thereof on a plate made of a glass material or a resin material, a polarization plate in which slits penetrating through a metal plate are formed in the metal plate, and an organic-based polarization plate using iodine or dichroic dye. In a case where the sensor portions 30a and 30b are arranged along the radial direction from the central side toward the outer circumferential side of the optical scale 2 in a plan view, a direction of the polarization axis of the polarization plate 38 of the sensor portion 30a may be inclined by 22.5° with respect to a direction of the polarization axis of the polarization plate 38 of the sensor portion 30b.

On the other hand, the sensor portion 30c illustrated in FIG. 1 includes the light emitting element 33 and the light receiving element 36. The light emitting element 33 applies light to the first track 23 of the optical scale 2, and the light receiving element 36 receives the light reflected at the optical scale 2. The sensor portion 30d includes the light emitting element 34 and the light receiving element 37. The light emitting element 34 applies light to the second track 24 of the optical scale 2, and the light receiving element 37 receives the light reflected at the optical scale 2.

Each of the light emitting elements 33 and 34 is, for example, a surface emitting laser (semiconductor laser) or a light emitting diode, and may emit light which is not polarized.

In the same manner as the light receiving element 35, each of the light receiving elements 36 and 37 is a photodiode using, for example, GaAs or Si, and has a function of outputting a current corresponding to a received light intensity as a detection signal.

Calculation Unit

The calculation unit 4 illustrated in FIG. 1 is configured to include a central processing unit (CPU) and a static random access memory (SRAM), and has a function of determining rotation states of the optical scale 2 by using signals from the light receiving elements 35, 36 and 37. The rotation states may include, for example, a rotation position, a rotation angle, a rotation speed, and a rotation direction.

As mentioned above, the configuration of the encoder 1 has been described. Hereinafter, an operation of the encoder 1 will be described.

Figure 4:
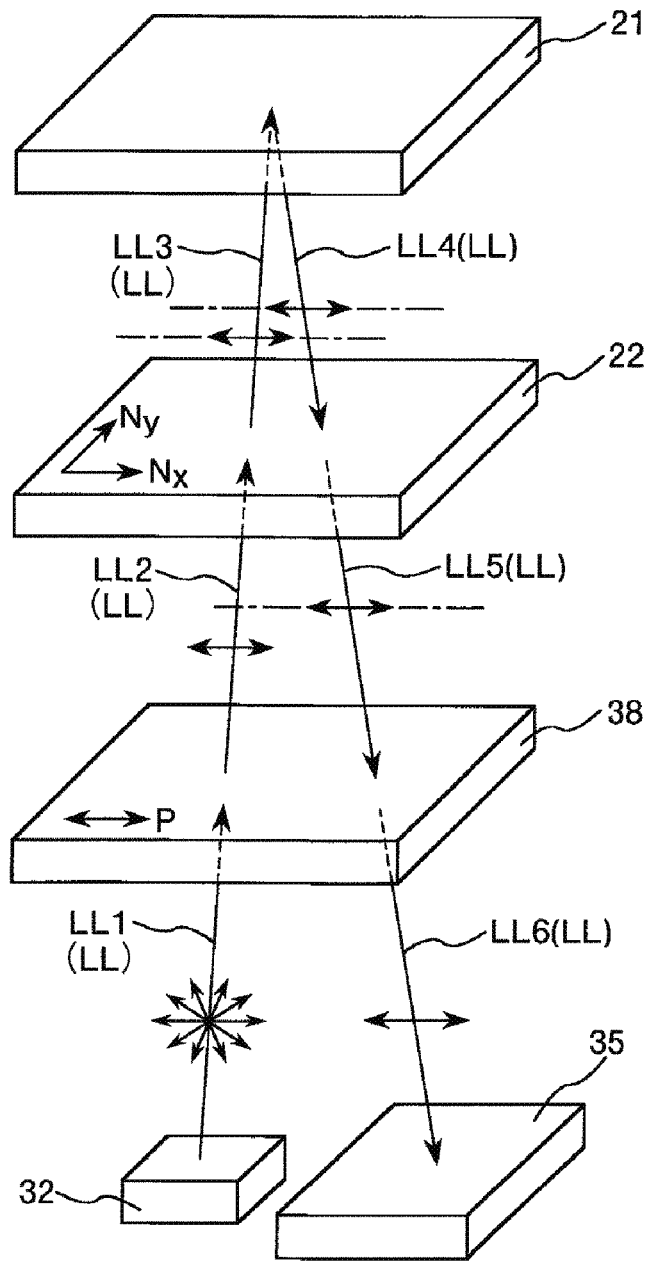
FIG. 4 is a conceptual diagram for explaining a polarization state of light received by the light receiving section when a slow axis of a phase difference plate is parallel to a direction of linearly polarized light from the light source section.
Figure 5:
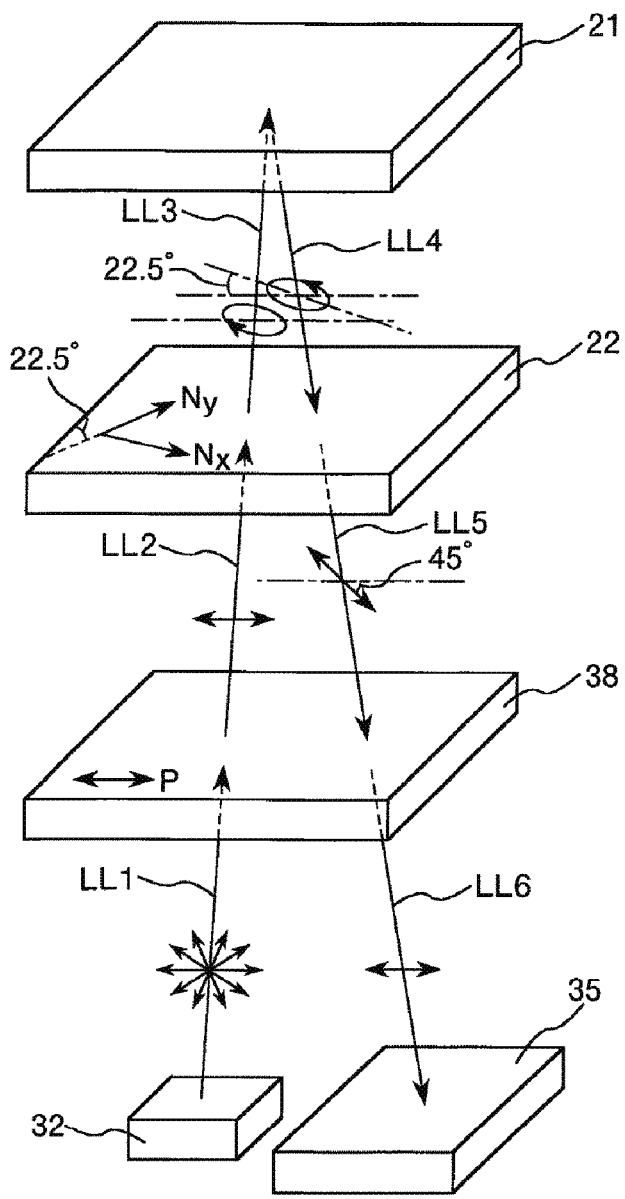
FIG. 5 is a conceptual diagram for explaining a polarization state of light received by the light receiving section when the slow axis of the phase difference plate is inclined by 22.5° with respect to the direction of linearly polarized light from the light source section.
Figure 6:
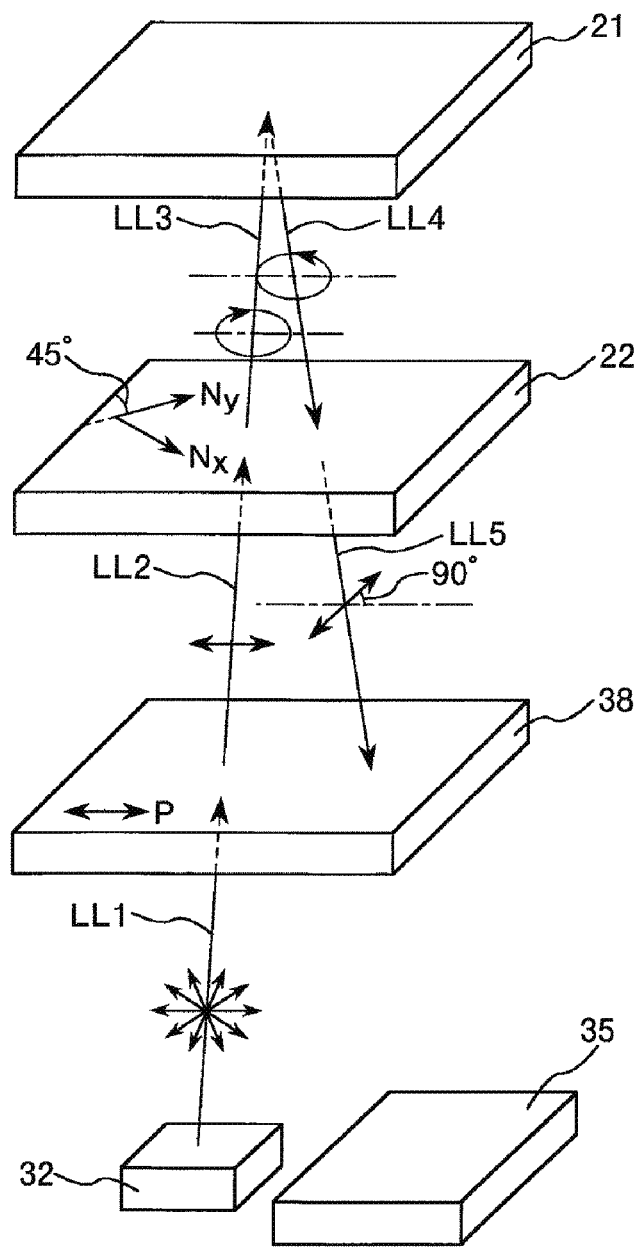
FIG. 6 is a conceptual diagram for explaining a polarization state of light received by the light receiving section when the slow axis of the phase difference plate is inclined by 45° with respect to the direction of linearly polarized light from the light source section.
Figure 7:
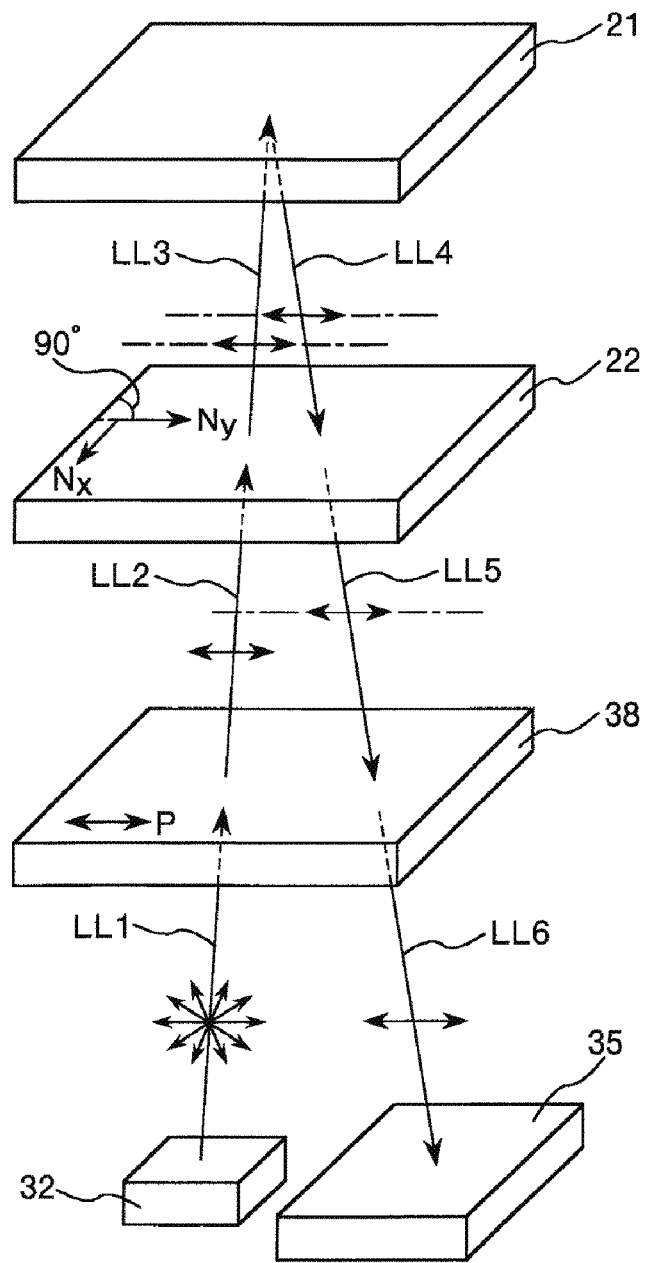
FIG. 7 is a conceptual diagram for explaining a polarization state of light received by the light receiving section when the slow axis of the phase difference plate is inclined by 90° with respect to the direction of linearly polarized light from the light source section.
Figure 8:
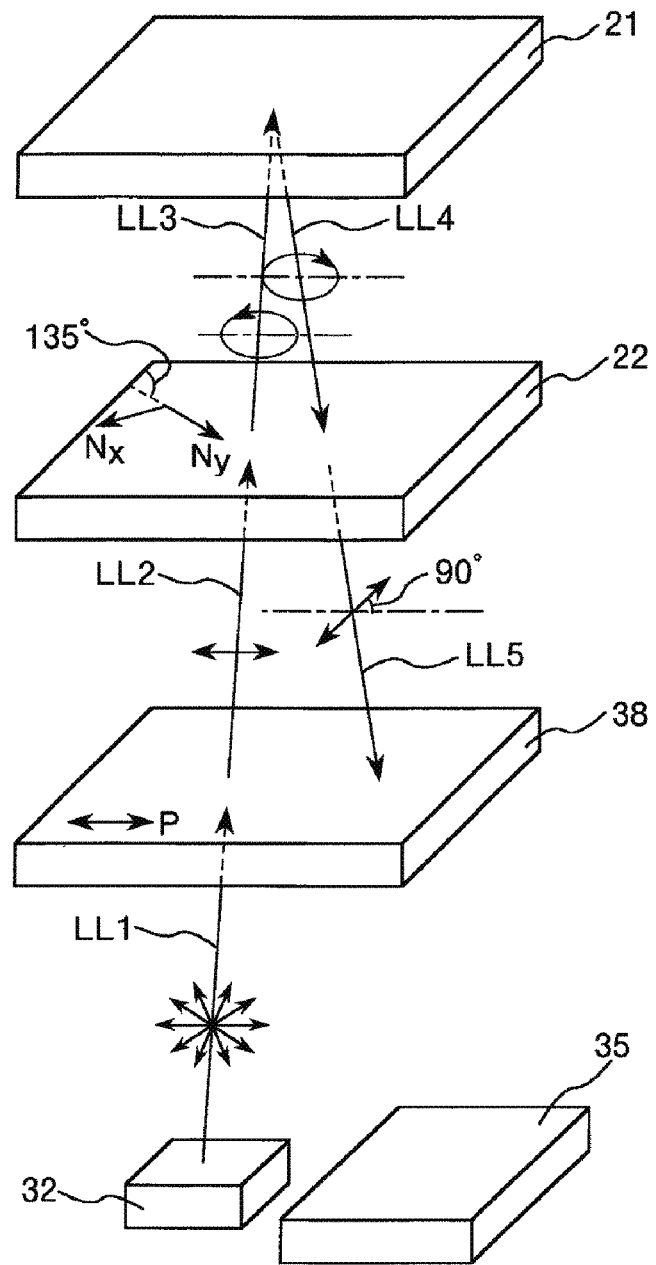
FIG. 8 is a conceptual diagram for explaining a polarization state of light received by the light receiving section when the slow axis of the phase difference plate is inclined by 135° with respect to the direction of linearly polarized light from the light source section.
Figure 9:
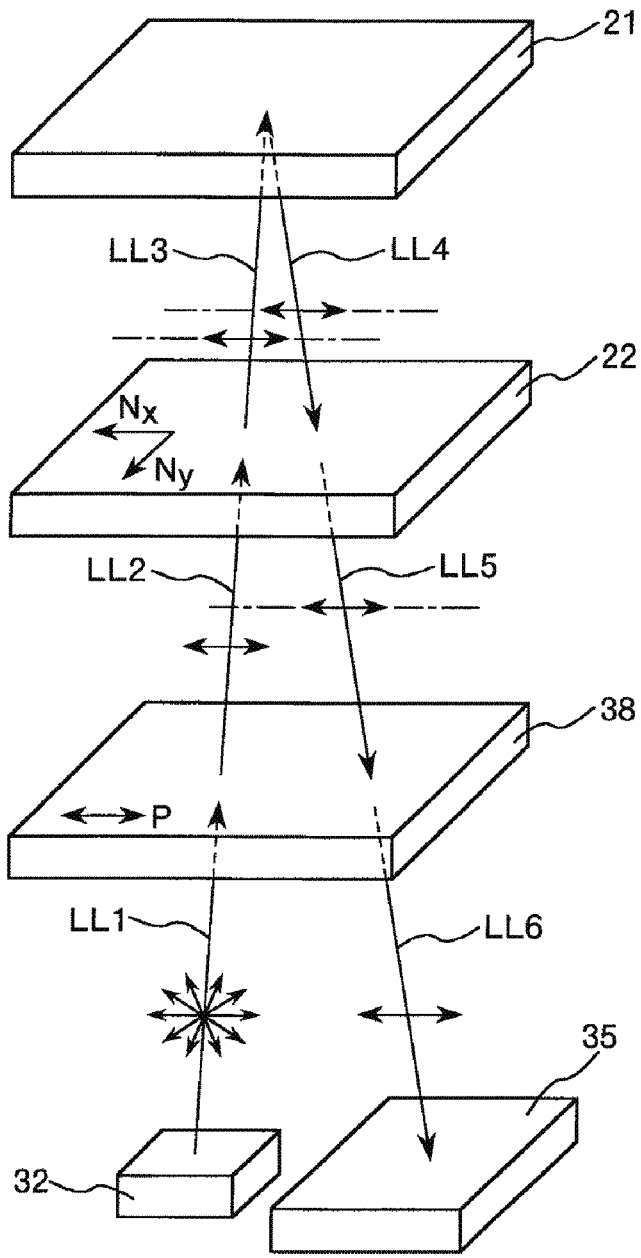
FIG. 9 is a conceptual diagram for explaining a polarization state of light received by the light receiving section when the slow axis of the phase difference plate is inclined by 180° with respect to the direction of linearly polarized light from the light source section.
Figure 10:
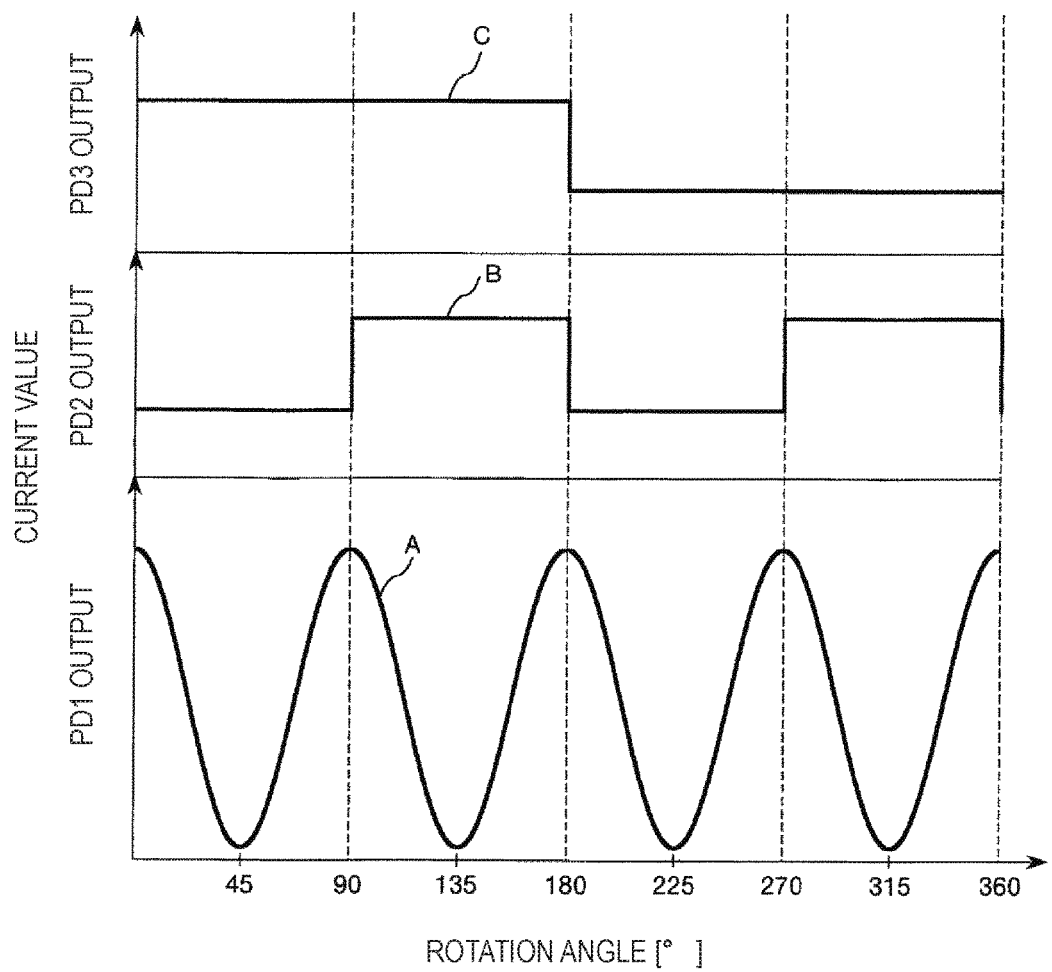
FIG. 10 shows graphs illustrating relationships between a rotation angle of the optical scale of the encoder illustrated in FIG. 1, and outputs (current values) from the first light receiving section (PD1), a second light receiving section (PD2), and a third light receiving section (PD3).

FIG. 4 is a conceptual diagram for explaining a polarization state of light received by the light receiving section when a slow axis of the phase difference plate is parallel to a direction of linearly polarized light from the light source section. FIG. 5 is a conceptual diagram for explaining a polarization state of light received by the light receiving section when the slow axis of the phase difference plate is inclined by 22.5° with respect to the direction of linearly polarized light from the light source section. FIG. 6 is a conceptual diagram for explaining a polarization state of light received by the light receiving section when the slow axis of the phase difference plate is inclined by 45° with respect to the direction of linearly polarized light from the light source section. FIG. 7 is a conceptual diagram for explaining a polarization state of light received by the light receiving section when the slow axis of the phase difference plate is inclined by 90° with respect to the direction of linearly polarized light from the light source section. FIG. 8 is a conceptual diagram for explaining a polarization state of light received by the light receiving section when the slow axis of the phase difference plate is inclined by 135° with respect to the direction of linearly polarized light from the light source section. FIG. 9 is a conceptual diagram for explaining a polarization state of light received by the light receiving section when the slow axis of the phase difference plate is inclined by 180° with respect to the direction of linearly polarized light from the light source section. FIG. 10 shows graphs illustrating relationships between a rotation angle of the optical scale of the encoder illustrated in FIG. 1, and outputs (current values) from the light receiving section 12 (PD1) which is a first light receiving section, the light receiving element 36 (PD2) which is a second light receiving section, and the light receiving element 37 (PD3) which is a third light receiving section.

As illustrated in FIG. 4, light LL1 which is natural light or partially polarized light emitted from the light emitting element 32 is incident to the polarization plate 38, and only a direction component along a polarization axis direction P (transmission axis direction) of the polarization plate 38 is transmitted through the polarization plate 38. Consequently, linearly polarized light LL2 in the direction along the polarization axis direction P from the polarization plate 38 is emitted toward the phase difference plate 22. The linearly polarized light LL2 is emitted from the phase difference plate 22 as light LL3 in a polarization state corresponding to a direction of a slow axis Nx of the phase difference plate 22. The light LL3 is reflected toward the phase difference plate 22 at the reflection plate 21 so as to become light LL4. The light LL4 is emitted from the phase difference plate 22 as light LL5 in a polarization state corresponding to the direction of the slow axis Nx of the phase difference plate 22. The light LL5 is incident to the polarization plate 38, and only a direction component along the polarization axis direction P of the polarization plate is transmitted through the polarization plate 38. Consequently, linearly polarized light LL6 in the direction along the polarization axis direction P from the polarization plate 38 is received by the light receiving element 35.

FIG. 4 illustrates a state in which the slow axis Nx of the phase difference plate 22 is parallel to the linear polarization direction (an oscillation direction of an electric field) of the light LL2, and, in this state, the light LL3, the light LL4, the light LL5, and the light LL6 are all linearly polarized light in the same direction as that of the light LL2. Here, the light LL5 is not almost absorbed by the polarization plate 38, and is transmitted through the polarization plate 38 so as to become the light LL6. An orientation of the phase difference plate 22 in which light advances fast (a refractive index is the minimum) is referred to as a "fast axis Ny", and, conversely, an orientation in which light advances slow (a refractive index is the maximum) is referred to as a "slow axis Nx".

As illustrated in FIG. 5, in a state in which the slow axis Nx of the phase difference plate 22 is inclined (rotated) by 22.5° with respect to the linear polarization direction of the light LL2, the light LL3 becomes elliptically polarized light having the direction along the slow axis Nx of the phase difference plate 22 as a major axis. The light LL4 becomes elliptically polarized light which is rotated reversely to the light LL3. Thus, the light LL5 becomes linearly polarized light in a direction rotated by 45° with respect to the linear polarization direction of the light LL2. Therefore, direction components of the light LL5 other than the direction along the polarization axis direction P are absorbed by the polarization plate 38, and thus a light amount of the light LL6 is a half of a light amount of the light LL5.

As illustrated in FIG. 6, in a state in which the slow axis Nx of the phase difference plate 22 is inclined (rotated) by 45° with respect to the linear polarization direction of the light LL2, the light LL3 becomes circularly polarized light. The light LL4 becomes circularly polarized light which is rotated reversely to the light LL3. Thus, the light LL5 becomes linearly polarized light in an oscillation direction which is linearly symmetric to the slow axis Nx, that is, linearly polarized light in a direction rotated by 90° with respect to the linear polarization direction of the light LL2. Therefore, direction components (that is, all) of the light LL5 other than the direction along the polarization axis direction P are absorbed by the polarization plate 38, and thus a light amount of the light LL6 is zero.

As illustrated in FIG. 7, in a state in which the slow axis Nx of the phase difference plate 22 is inclined (rotated) by 90° with respect to the linear polarization direction of the light LL2, the light LL5 is not almost absorbed by the polarization plate 38, and is transmitted through the polarization plate 38 so as to become the light LL6 in the same manner as in the case illustrated in FIG. 4.

As illustrated in FIG. 8, in a state in which the slow axis Nx of the phase difference plate 22 is inclined (rotated) by 135° with respect to the linear polarization direction of the light LL2, the light LL5 becomes linearly polarized light in a direction rotated by 90° with respect to the linear polarization direction of the light LL2, and thus a light amount of the light LL6 is zero in the same manner as in the case illustrated in FIG. 6.

As illustrated in FIG. 9, in a state in which the slow axis Nx of the phase difference plate 22 is inclined (rotated) by 180° with respect to the linear polarization direction of the light LL2, the light LL5 is not almost absorbed by the polarization plate 38, and is transmitted through the polarization plate 38 so as to become the light LL6 in the same manner as in the case illustrated in FIG. 4.

As mentioned above, a light amount of the light LL6 changes in a periodic manner depending on an inclined angle of the slow axis Nx of the phase difference plate 22 with respect to the linear polarization direction of the light LL2. Here, an inclined angle of the slow axis Nx of the phase difference plate 22 with respect to the linear polarization direction of the light LL2 corresponds to a rotation angle of the optical scale 2. Therefore, as indicated by A in FIG. 10, an output (PD1) from the Light receiving element 35 changes in a sine wave form according to a rotation angle of the optical scale 2. Although not illustrated, a phase of an output from the light receiving element 35 of the sensor portion 30a is deviated by 22.5° relative to a phase of an output from the light receiving element 35 of the sensor portion 30b. Therefore, in a case where one of the outputs is used as an A-phase signal, and the other output is used as a B-phase signal, a rotation angle of the optical scale 2 can be easily determined within each range such as a range from 0° to 90°, a range from 90° to 180°, a range from 180° to 270°, and a range from 270° to 360°.

Here, the output from the light receiving element 35 has the same waveform when a rotation angle of the optical scale 2 is in a range from 0° to 90°, a range from 90° to 180°, a range from 180° to 270°, and a range from 270° to 360°. Thus, a range of a rotation angle of the optical scale 2 cannot be identified on the basis of only a signal from the light receiving element 35.

Therefore, among the range from 0° to 90°, the range from 90° to 180°, the range from 180° to 270°, and the range from 270° to 360°, a range of a rotation angle of the optical scale 2 is determined by using signals from the light receiving elements 36 and 37.

Specifically, as described above, the region 231 and the region 232 of the first track 23 have differing reflectance, and thus an output (PD2) from the light receiving element 36 changes in a binary value form as indicated by B in FIG. 10. Here, the output from the light receiving element 36 has different values in the ranges of 0° to 90° and 180° to 270°, and the ranges of 90° to 180° and 270° to 360°.

As described above, the region 241 and the region 242 of the second track 24 have differing reflectance, and thus an output (PD3) from the light receiving element 37 changes in a binary value form as indicated by C in FIG. 10. Here, the output from the light receiving element 37 has different values in the range of 0° to 180° and the range of 180° to 360°.

In a case where output results of the light receiving elements 36 and 37 are combined with each other, it is possible to determine one of the range from 0° to 90°, the range from 180° to 270°, the range from 90° to 180°, and the range from 270° to 360°.

As mentioned above, the encoder 1 includes the optical scale 2 provided with the phase difference plate 22, the light source section 11 emitting the light LL applied to the phase difference plate 22, and the light receiving section 12 receiving the light LL from the phase difference plate 22 and outputting a signal corresponding to a received light intensity.

According to the encoder 1, since a polarization state of the light LL from the phase difference plate 22 changes according to a rotation state of the optical scale 2, it is possible to detect a rotation state of the optical scale 2 by using a light reception state in the light receiving section 12. Therefore, it is possible to detect a rotation state of the optical scale 2 without using a polarization plate in the optical scale 2. Manufacturing cost of the phase difference plate 22 is relatively low, and thus it is possible to achieve low cost of the encoder 1.

Here, the light LL emitted from the light source section 11 is linearly polarized, and the light receiving section 12 outputs a signal corresponding to a polarization state (specifically, a linear polarization direction) of the light LL from the phase difference plate 22. Consequently, a polarization state of the light LL from the phase difference plate 22 can be changed according to a rotation state of the optical scale 2. An output signal from the light receiving section 12 can be changed according to a rotation state of the optical scale 2.

In the present embodiment, the phase difference plate 22 is a λ/4 plate, and the optical scale 2 has the reflection plate 21 having light reflectance property, disposed on an opposite side to the light source section 11 with respect to the phase difference plate 22. Consequently, it is possible to implement the reflection type encoder 1.

The light source section 11 includes the light emitting element 32 which is a light emitting diode, and the polarization plate 38 at least a part of which is disposed between the light emitting element 32 and the phase difference plate 22. Consequently, it is possible to implement the light source section 11 which has a long service life and stably emits linearly polarized light (light LL2) with a reliably simple and cheap configuration.

The light receiving section 12 includes the light receiving element 35, and the polarization plate 38 at least a part of which is disposed between the light receiving element 35 and the phase difference plate 22. Consequently, it is possible to implement the light receiving section 12 which outputs a signal corresponding to a polarization state (specifically, a linear polarization direction) of light (light LL5) from the phase difference plate 22 with a relatively simple configuration.

The optical scale 2 includes the 90° determination patterns 13 which are provided along the circumferential direction around the central axis (rotation axis ax) of the optical scale 2 and include the regions 231, 232, 241 and 242 which are different identification patterns every 90° in the circumferential direction. Consequently, it is possible to implement the absolute type encoder 1.

Second Embodiment

Figure 11:
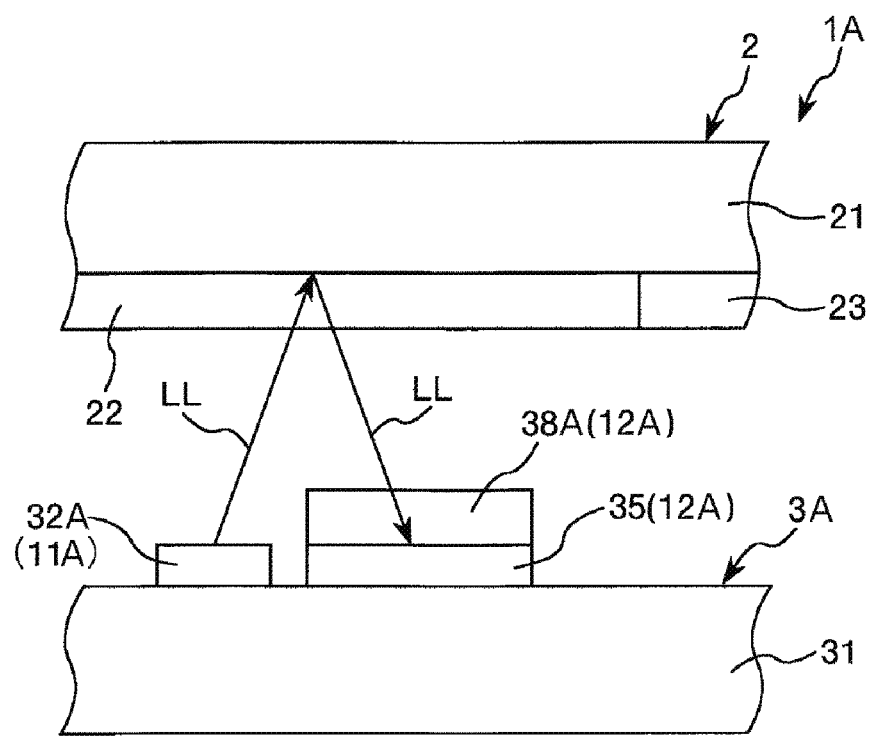
FIG. 11 is a schematic sectional view for explaining a light source section (first light source section) and a light receiving section (first light receiving section) provided in an encoder according to a second embodiment of the invention.

FIG. 11 is a schematic sectional view for explaining a light source section (first light source section) and a light receiving section (first light receiving section) provided in an encoder according to a second embodiment of the invention.

Hereinafter, the second embodiment will be described focusing on differences from the above-described embodiment, and a description of the same content will be omitted. In FIG. 11, the same constituent elements as those in the above-described embodiment are given the same reference numerals.

The present embodiment is the same as the first embodiment except for a configuration of a light source section.

A sensor unit 3A provided in an encoder 1A illustrated in FIG. 11 includes a light emitting element 32A and a polarization plate 38A instead of the light emitting element 32 and the polarization plate 38 of the sensor unit 3 of the first embodiment. In the sensor unit 3A, the light emitting element 32A applies light LL to the phase difference plate 22 of the optical scale 2, and the light receiving element 35 receives the light LL reflected at the optical scale 2 via the polarization plate 38A. Here, the light emitting element 32A forms a "light source section 11A" emitting the light LL applied to the phase difference plate 22. The light receiving element 35 and the polarization plate 38A form a "light receiving section 12A" receiving the light LL from the phase difference plate 22.

The light emitting element 32A is, for example, a surface emitting laser (vertical cavity surface emitting laser (VCSEL)). The light emitting element 32A has a function of emitting the light LL which is linearly polarized in a predetermined direction (a direction corresponding to the polarization axis direction of the polarization plate 38 in the first embodiment). The light emitting element 32A is not particularly limited, but may employ a surface emitting laser using, for example, a semiconductor material of AlGaAs type, GaInP type, ZnSSe type, InGaN type, AlGaN type, InGaAs type, GaInNAs type, and GaAsSb type.

The light LL emitted from the light emitting element 32A may include components other than a linearly polarized component or may change in a linear polarization direction, but, in this case, preferably, the number of the components other than a linearly polarized component is as small as possible or the change in a linear polarization direction is as little as possible (each of an amount of other components relative to a desired linearly polarized component and a changed angle of a linear polarization direction is equal to or less than 5%).

As mentioned above, the light source section 11A includes the light emitting element 32A which is a surface emitting laser. Consequently, it is possible to realize miniaturization of the light source section 11A, and to implement the light source section 11A emitting linearly polarized light LL. Since the directivity of the light LL from the light emitting element 32A which is a surface emitting laser is considerably high, crosstalk in the light receiving section 12A can be reduced, and, as a result, the detection accuracy can be improved. A wavelength region of the light LL from the light emitting element 32A which is a surface emitting laser is considerably narrow, and thus it is possible to reduce deterioration in the detection accuracy due to wavelength dependency of an optical component such as the phase difference plate 22.

The polarization plate 38A does not overlap the light emitting element 32A and is disposed to overlap only the light receiving element 35 in a plan view. The polarization plate 38A is joined to the light receiving element 35 via, for example, an optical adhesive, so as to be integrated with the light receiving element 35.

The encoder 1A of the second embodiment as described above can also achieve the same advantageous effects as in the first embodiment, and it is possible to achieve low cost.

Third Embodiment

Figure 12:
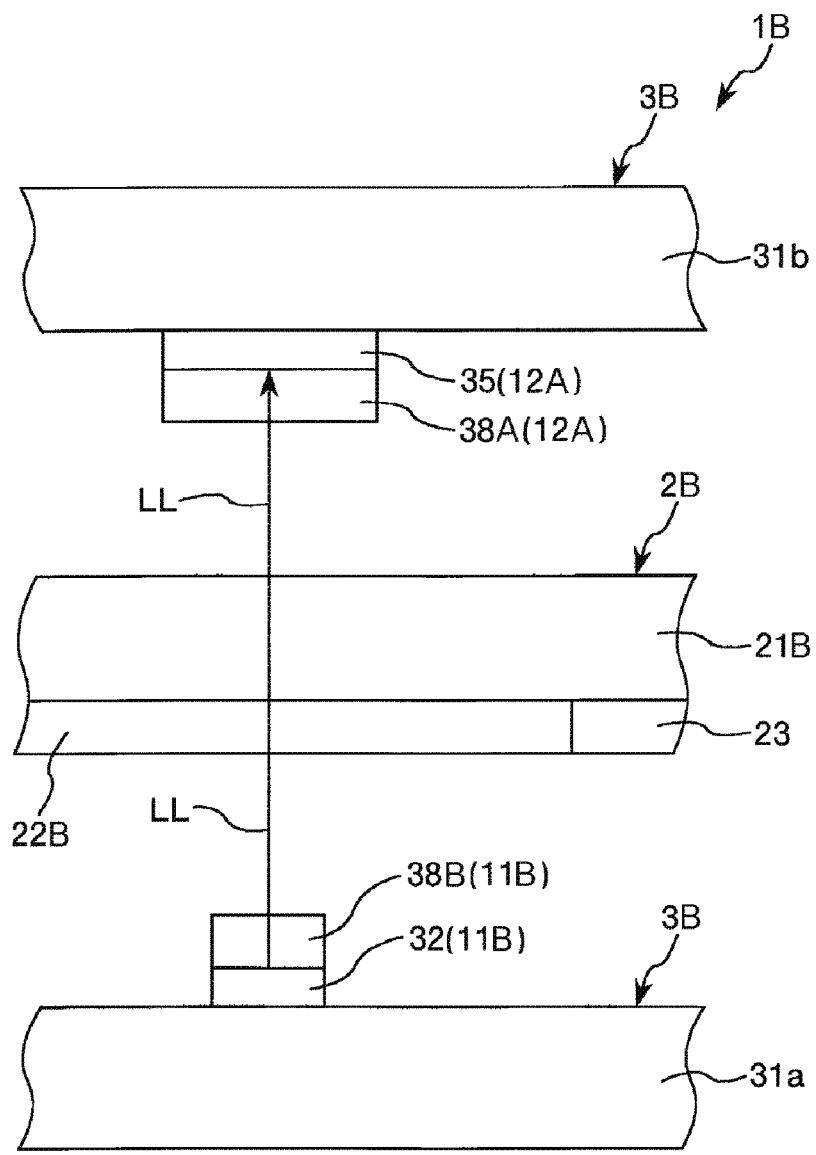
FIG. 12 is a schematic sectional view for explaining a light source section (first light source section) and a light receiving section (first light receiving section) provided in an encoder according to a third embodiment of the invention.

FIG. 12 is a schematic sectional view for explaining a light source section (first light source section) and a light receiving section (first light receiving section) provided in an encoder according to a third embodiment of the invention.

Hereinafter, the third embodiment will be described focusing on differences from the above-described embodiments, and a description of the same content will be omitted. In FIG. 12, the same constituent elements as those in the above-described embodiments are given the same reference numerals.

The present embodiment is the same as the first embodiment except for a configuration of an optical scale and arrangement of a light receiving section.

An encoder 1B illustrated in FIG. 12 includes an optical scale 2B and a sensor unit 3B instead of the optical scale 2 and the sensor unit 3 of the first embodiment.

The optical scale 2B includes a light-transmissive plate 21B and a phase difference plate 22B instead of the reflection plate 21 and the phase difference plate 22 of the first embodiment. The light-transmissive plate 21B (substrate) has transmission property for light from the light emitting element 32. A constituent material of the light-transmissive plate 21B is not particularly limited, and may be, for example, a glass material or a resin material, and is preferably a material which does not have birefringence property. The phase difference plate 22B is a λ/2 plate.

The phase difference plate 22B may be disposed on the light-transmissive plate 21B on the light receiving section 12A side. A phase difference caused by the phase difference plate 22B may be (2n+1)×λ/2. Here, n is an integer of 0 or greater. The phase difference plate 22B may be formed of a combination of a plurality of phase difference plates such that the phase difference is caused. For example, instead of the phase difference plate 22B, a combination of two phase difference plates 22 of the first embodiment may be used, and, in this case, the two phase difference plates 22 may be disposed on one side of the light-transmissive plate 21B, and may be disposed with the light-transmissive plate 21B interposed therebetween. In a case where the phase difference plate 22B has sufficient rigidity, the light-transmissive plate 21B may be omitted. The phase difference plate 22B may be formed integrally with the light-transmissive plate 21B.

The sensor unit 3B includes a substrate 31a disposed on one side (a lower side in FIG. 12) with respect to the optical scale 2B, a light source section 11B disposed on a surface of the substrate 31a on the optical scale 2B side, a substrate 31b disposed on the other side (an upper side in FIG. 12) with respect to the optical scale 2B, and a light receiving section 12A provided on a surface of the substrate 31b on the optical scale 2B side.

The substrate 31a is a wiring substrate, supports the light source section 11B, and is also electrically connected to the light source section 11B. The light source section 11B includes a light emitting element 32 provided on the substrate 31a, and a polarization plate 38B provided on a surface of the light emitting element 32 on an opposite side to the substrate 31a, and the light emitting element 32 irradiates the phase difference plate 22B of the optical scale 2B with the light LL via the polarization plate 38B.

The substrate 31b is a wiring substrate, supports the light receiving section 12A, and is also electrically connected to the light receiving section 12A. The light receiving section 12A includes a light receiving element 35 provided on the substrate 31b, and a polarization plate 38A provided on a surface of the light receiving element 35 on an opposite side to the substrate 31b, and the light receiving element 35 receives the light LL transmitted through the optical scale 2B via the polarization plate 38A. Here, a polarization axis of the polarization plate 38A is disposed to be parallel to a polarization axis of the polarization plate 38B.

In the encoder 1B, since the phase difference plate 22B of the optical scale 2B is a λ/2 plate, the light LL is transmitted through the phase difference plate 22B, and thus the same action of the light LL being transmitted through the phase difference plate 22 of the first embodiment twice as described above is caused. Although not illustrated, a light source section and a light receiving section for the first track 23 and the second track 24 may be disposed with the optical scale 2B interposed therebetween in the same manner as the light source section 11B and the light receiving section 12A, and may be disposed on one side (the light source section 11B side or the light receiving section 12A side) with respect to the optical scale 2B in the same manner as in the first embodiment.

As mentioned above, in the encoder 1B, the phase difference plate 22B is a λ/2 plate, and at least a part of the phase difference plate 22B is located between the light source section 11B and the light receiving section 12A. Consequently, it is possible to implement the transmission type encoder 1B.

The third embodiment can also achieve low cost.

2. Robot

Figure 13:
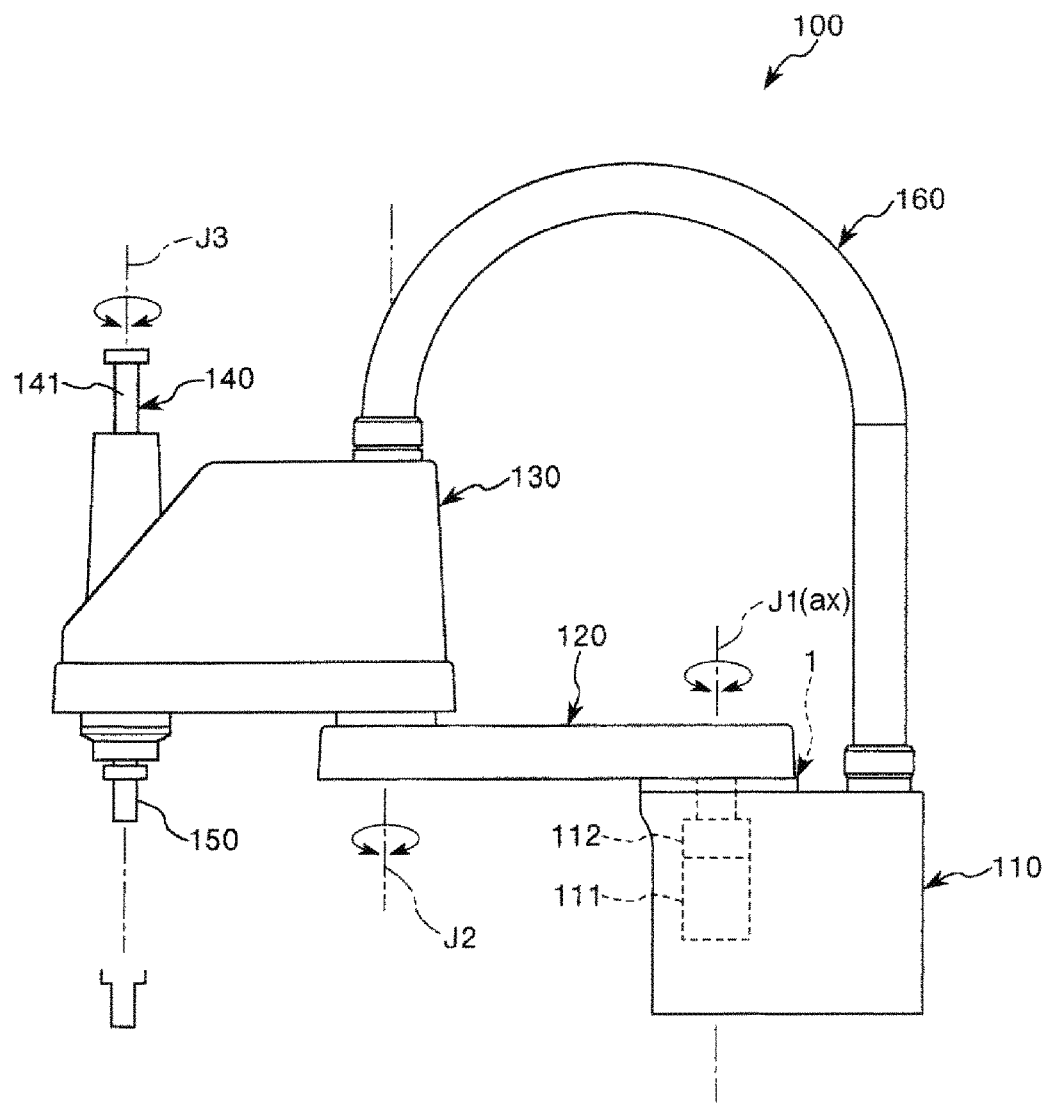
FIG. 13 is a side view illustrating a robot of an embodiment of the invention.

FIG. 13 is a side view illustrating a robot of an embodiment of the invention. In the following description, for convenience of description, in FIG. 13, an upper part is referred to as an "upper side", and a lower part is referred to as a "lower side". In FIG. 13, a base side is referred to as a "basal end", and an opposite side (end effector side) thereto is referred to as a "distal end". In FIG. 13, an upward-and-downward direction is referred to as a "vertical direction", and a leftward-and-rightward direction is referred to as a "horizontal direction".

A robot 100 illustrated in FIG. 13, which is a so-called horizontal articulated robot (scalar robot), is used for a manufacturing process of manufacturing, for example, precision equipment, and can perform holding or transport of the precision equipment or components.

As illustrated in FIG. 13, the robot 100 includes a base 110, a first arm 120, a second arm 130, a work head 140, an end effector 150, and a wiring routing portion 160. Hereinafter, the respective portions of the robot 100 will be described briefly in order.

The base 110 is fixed to, for example, a floor surface (not illustrated) via bolts or the like. The first arm 120 is connected to an upper end of the base 110. The first arm 120 is rotatable about a first rotation axis J1 along the vertical direction with respect to the base 110.

The base 110 is provided with a first motor 111 which generates drive force for rotating the first arm 120, and a first decelerator 112 which reduces the driving force from the first motor 111. An input shaft of the first decelerator 112 is connected to a rotation shaft of the first motor 111, and an output shaft of the first decelerator 112 is connected to the first arm 120. Thus, if the first motor 111 is driven, and a driving force therefrom is forwarded to the first arm 120 via the first decelerator 112, the first arm 120 is rotated about the first rotation axis J1 in a horizontal plane with respect to the base 110.

The encoder 1 which is a first encoder detecting a state of the first arm 120 being rotated with respect to the base 110 is provided at the base 110 and the first arm 120. Specifically, for example, the above-described optical scale 2 is attached to an output shaft of the first decelerator 112 or the first arm 120, and the sensor unit 3 is attached to the base 110 or a member fixed thereto.

A distal end of the first arm 120 is connected to the second arm 130. The second arm 130 is rotatable about a second axis J2 along the vertical direction with respect to the first arm 120. Although not illustrated, the second arm 130 is provided with a second motor which generates drive force for rotating the second arm 130, and a second decelerator which reduces the driving force from the second motor. The driving force from the second motor is forwarded to the second arm 130 via the second decelerator, and thus the second arm 130 is rotated about the second axis J2 in a horizontal plane with respect to the first arm 120. Although not illustrated, the second motor is provided with a second encoder which detects a state of the second arm 130 being rotated with respect to the first arm 120.

The work head 140 is disposed at a distal end of the second arm 130. The work head 140 includes a spline shaft 141 inserted into a spline nut and a ball screw nut (none illustrated) which are coaxially disposed at the distal end of the second arm 130. The spline shaft 141 can be rotated about an axis thereof and can be moved up and down in the vertical direction, with respect to the second arm 130.

Although not illustrated, the second arm 130 is provided with a rotation motor and a lifting motor. If drive force from the rotation motor is forwarded to the spline nut via a drive force forwarding mechanism (not illustrated), and thus the spline nut is rotated in normal and reverse directions, the spline shaft 141 is rotated in the normal and reverse directions about an axis J3 along the vertical direction. Although not illustrated, the rotation motor is provided with a third encoder which detects a state of the spline shaft 141 being rotated with respect to the second arm 130.

On the other hand, if drive force from the lifting motor is forwarded to the ball screw nut via a drive force forwarding mechanism (not illustrated), and thus the ball screw nut is rotated in normal and reverse directions, the spline shaft 141 is moved up and down. The lifting motor is provided with a fourth encoder detecting a movement amount of the spline shaft 141 with respect to the second arm 130.

A distal end (lower end) of the spline shaft 141 is connected to the end effector 150. The end effector 150 is not particularly limited, and may employ, for example, an effector holding an object to be transported, or an effector processing an object to be processed.

A plurality of wires connected to the respective electronic components (for example, the second motor, the rotation motor, the lifting motor, and the second to fourth encoders) disposed in the second arm 130 are routed to the base 110 through the tubular wiring routing portion 160 which connects the second arm 130 to the base 110. The plurality of wires are collected inside the base 110, and are thus routed to a control device (not illustrated) which is provided outside the base 110 and generally controls the robot 100 along with wires connected to the first motor 111 and the encoder 1.

As mentioned above, the robot 100 includes the encoder 1. According to the robot 100, it is possible to achieve low cost of the encoder 1, and thus to achieve low cost of the robot 100.

3. Printer

FIG. 14 is a side view illustrating a printer of an embodiment of the invention.

A printer 1000 illustrated in FIG. 14 is a label printing device including a drum-shaped platen. In the printer 1000, a single sheet S (web) such as a paper type or a film type as a recording medium of which both ends are wound on a delivery shaft 1120 and a winding shaft 1140 in a roll form is hung between the delivery shaft 1120 and the winding shaft 1140, and the sheet S is transported from the delivery shaft 1120 to the winding shaft 1140 along a transport path Sc hung in the above-described way. The printer 1000 is configured to record (form) an image on the sheet S by discharging a functional liquid onto the sheet S transported along the transport path Sc.

The printer 1000 is configured to include a delivery portion 1102 which delivers the sheet S from the delivery shaft 1120, a process portion 1103 which records an image on the sheet S delivered from the delivery portion 1102, a laser scanner device 1007 which cuts out the sheet S on which the image is recorded in the process portion 1103, and a winding portion 1104 which winds the sheet S on the winding shaft 1140.

The delivery portion 1102 includes the delivery shaft 1120 winding an end of the sheet S thereon, and a driven roller 1121 winding the sheet S extracted from the delivery shaft 1120 thereon.

In the process portion 1103, the sheet S delivered from the delivery portion 1102 is supported by a platen drum 1130 as a support portion, and a recording head 1151 or the like disposed in a head unit 1115 which is disposed along an outer circumferential surface of the platen drum 1130 performs an appropriate process so as to record an image on the sheet S.

The platen drum 1130 is a circular drum which is rotatably supported by a support mechanism (not illustrated) centering on a drum shaft 1130s, and winds the sheet S transported from the delivery portion 1102 to the winding portion 1104 on a rear surface (a surface on an opposite side to a recording surface) side thereon. The platen drum 1130 is driven to rotate in a transport direction Ds of the sheet S as a result of receiving friction force with the sheet S, and supports the sheet S from the rear surface side in a range Ra in the circumferential direction thereof. Here, the process portion 1103 is provided with driven rollers 1133 and 1134 turning the sheet S on both sides of the winding portion to the platen drum 1130. Driven rollers 1121 and 1131 and a sensor Se are provided between the delivery shaft 1120 and the driven roller 1133, and driven rollers 1132 and 1141 are provided between the winding shaft 1140 and the driven roller 1134.

The process portion 1103 includes a head unit 1115, and the head unit 1115 is provided with four recording heads 1151 corresponding to yellow, cyan, magenta, and black. Each of the recording heads 1151 faces a front surface of the sheet S wound on the platen drum 1130 with a slight clearance (platen gap), and discharges a functional liquid of a corresponding color from nozzles in an ink jet method. The respective recording heads 1151 discharge functional liquids onto the sheet S transported in the transport direction Ds, and thus a color image is formed on the front surface of the sheet S.

Here, as the functional liquids, ultraviolet (UV) ink (photocurable ink) which is cured when being irradiated with ultraviolet rays (light) is used. Thus, the head unit 1115 of the process portion 1103 is provided with first UV light sources 1161 (light irradiation portions) among the plurality of recording heads 1151 in order to temporarily cure the UV ink and to fix the UV ink to the sheet S. A second UV light source 1162 as a curing portion is provided on a downstream side of the transport direction Ds with respect to the plurality of recording heads 1151 (head unit 1115).

The laser scanner device 1007 is provided to partially cut out the sheet S on which an image is recorded, or to divide the sheet S. Laser light which is caused to oscillate by a laser oscillator 1401 of the laser scanner device 1007 is applied to the sheet S which is a processed object via a first lens 1403 and a first mirror 1407 or a second mirror 1409 of which positions or rotation positions (angles) are controlled by drive devices 1402, 1406 and 1408 including the encoder 1. As mentioned above, an irradiation position of laser light LA applied to the sheet S is controlled by the respective drive devices 1402, 1406 and 1408, and thus the laser light LA can be applied to a desired position on the sheet S. In the sheet S, a portion thereof irradiated with the laser light LA is melted, and thus the sheet S is partially cut out or divided.

As mentioned above, the printer 1000 includes the encoder 1. According to the printer 1000, it is possible to achieve low cost of the encoder 1, and thus to achieve low cost of the printer 1000.

As mentioned above, the encoder, the robot, and the printer according to the preferred embodiments of the invention have been described, but the invention is not limited thereto, and a configuration of each portion may be replaced with any configuration having the same function. Any other constituent element may be added thereto.

A location where the encoder is provided is not limited to a joint between the base and the first arm, and may be a joint between any two arms which are relatively rotated. A location where the encoder is provided is not limited to a joint of the robot.

In the above-described embodiments, the number of arms of the robot is one, but the number of arms of the robot is not limited thereto, and may be, for example, two or more. In other words, the robot according to the embodiments of the invention may be, for example, a robot with two arms or a robot with a plurality of arms.

In the above-described embodiments, the number of arms of the robot is two, but the number of arms of the robot is not limited thereto, and may be, for example, one, or three or more.

In the above-described embodiments, a location where the robot according to the embodiments of the invention is provided is not limited to a floor surface, and may be, for example, a ceiling surface or a sidewall surface. The robot according to the embodiments of the invention is not limited to being provided to be fixed to a structure such as a building, and may be, for example, a leg type walking (traveling) robot having legs.

In the above-described embodiments, as an example of a robot according to the embodiments of the invention, the horizontal articulated robot has been described, but a robot according to the embodiments of the invention may be robots of other types such as a vertical articulated robot as long as two members which are relatively rotated are provided therein.

The encoder according to the embodiments of the invention is not limited to the above-described printer, and may be used for various printers such as an industrial printer with a rotation unit and a consumer printer. In a case where the encoder according to the embodiments of the invention is used for a printer, a location where the encoder is provided is not limited to the above-described locations, and may be used for a paper feeding mechanism, for example.

The entire disclosure of Japanese Patent Application No. 2016-245139, filed Dec. 19, 2016 is expressly incorporated by reference herein.

What is claimed is:

1. An encoder comprising:
an optical scale that has a phase difference plate;
a light source configured to irradiate a light to the phase difference plate, the light emitted from the light source is linearly polarized; and
a light receiver configured to receive the light from the phase difference plate so as to output a signal corresponding to an intensity of the received light,
wherein the signal from the light receiver further corresponds to a polarization state of the received light, and
wherein the light receiver includes:
a light receiving element; and
a first polarization plate, at least a part of the first polarization plate being disposed between the light receiving element and the phase difference plate.

2. The encoder according to claim 1,
wherein the phase difference plate is a $\lambda/4$ plate, and
wherein the optical scale includes a reflection plate that is disposed on an opposite side to the light source with respect to the phase difference plate and has light reflection property.

3. The encoder according to claim 1,
wherein the phase difference plate is a $\lambda/2$ plate, and
wherein at least a part of the phase difference plate is disposed between the light source and the light receiver.

4. The encoder according to claim 1,
wherein the light source is a surface emitting laser.

5. The encoder according to claim 1,
wherein the light source section includes:
a light emitting diode; and
a second polarization plate, at least a part of the second polarization plate being disposed between the light emitting diode and the phase difference plate.

6. The encoder according to claim 1,
wherein the optical scale includes identification patterns which are provided in a circumferential direction around a central axis of the optical scale and are different from each other every 90° in the circumferential direction.

7. A robot comprising claim 1:
a base;
an arm connected to the base; and
an encoder configured to detect a movement of the arm relative to the base, the encoder including:
an optical scale that has a phase difference plate;
a light source configured to irradiate a light to the phase difference plate, the light emitted from the light source is linearly polarized; and
a light receiver configured to receive the light from the phase difference plate so as to output a signal corresponding to an intensity of the received light,
wherein the signal from the light receiver further corresponds to a polarization state of the received light, and
wherein the light receiver includes:
a light receiving element; and
a first polarization plate, at least a part of the first polarization plate being disposed between the light receiving element and the phase difference plate.

8. A robot according to claim 7,
wherein the phase difference plate is a $\lambda/4$ plate, and
wherein the optical scale includes a reflection plate that is disposed on an opposite side to the light source with respect to the phase difference plate and has light reflection property.

9. A robot according to claim 7,
wherein the phase difference plate is a λ/2 plate, and
wherein at least a part of the phase difference plate is disposed between the light source and the light receiver.

10. A robot according to claim 7,
wherein the light source is a surface emitting laser.

11. A robot according to claim 7,
wherein the light source section includes:
   a light emitting diode; and
   a second polarization plate, at least a part of the second polarization plate being disposed between the light emitting diode and the phase difference plate.

12. A printer comprising:
a head member configured to form an image on a medium;
a transfer mechanism configured to transfer the medium;
a laser scanner configured to emit a laser beam toward the medium, the laser scanner having an angle change mechanism being configured to change a beam emitting angle of the laser beam; and
an encoder configured to detect a movement of the angle change mechanism, the encoder including:
   an optical scale that has a phase difference plate;
   a light source configured to irradiate a light to the phase difference plate, the light emitted from the light source is linearly polarized; and
   a light receiver configured to receive the light from the phase difference plate so as to output a signal corresponding to an intensity of the received light,
   wherein the signal from the light receiver further corresponds to a polarization state of the received light, and
   wherein the light receiver includes:
      a light receiving element; and
      a first polarization plate, at least a part of the first polarization plate being disposed between the light receiving element and the phase difference plate.

13. A printer according to claim 12,
wherein the phase difference plate is a λ/4 plate, and
wherein the optical scale includes a reflection plate that is disposed on an opposite side to the light source with respect to the phase difference plate and has light reflection property.

14. A printer according to claim 12,
wherein the phase difference plate is a λ/2 plate, and
wherein at least a part of the phase difference plate is disposed between the light source and the light receiver.

15. A printer according to claim 12,
wherein the light source is a surface emitting laser.

16. A printer according to claim 12,
wherein the light source section includes:
   a light emitting diode; and
   a second polarization plate, at least a part of the second polarization plate being disposed between the light emitting diode and the phase difference plate.

* * * * *